United States Patent

[11] 3,602,036

[72] Inventor Axel H. Peterson
Jefferson Borough, Pa.
[21] Appl. No. 849,657
[22] Filed Aug. 13, 1969
[45] Patented Aug. 31, 1971
[73] Assignee United States Steel Corporation

[54] ULTRASONIC PIPE-TESTING EQUIPMENT
14 Claims, 10 Drawing Figs.
[52] U.S. Cl. ..................... 73/67.8, 73/71.5
[51] Int. Cl. ..................... G01n 29/04
[50] Field of Search ..................... 73/67.7–67.9, 71.5

[56] References Cited
UNITED STATES PATENTS

| | | | |
|---|---|---|---|
| 3,056,285 | 10/1962 | Gibson et al. | 73/67.8 |
| 3,105,380 | 10/1963 | Stebbins | 73/67.8 |
| 3,289,468 | 12/1966 | Van Der Veer et al. | 73/71.5 |
| 3,382,707 | 5/1968 | Heselwood | 73/71.5 |
| 3,485,088 | 12/1969 | O'Conner | 73/71.5 X |
| 3,504,534 | 4/1970 | Mandula | 73/71.5 |

Primary Examiner—Richard C. Queisser
Assistant Examiner—Arthur E. Korkosz
Attorney—William G. Young ABSTRACT: Ultrasonic pipe inspection apparatus having an articulated support for holding contoured inspection shoes on a pipe in operative positions on opposite sides of a weld to be inspected. The articulated support comprises a linkage having a resilient bias for moving the shoes to positions in engagement with the surface of the pipe, and a universal connection mounting the shoes for limited swiveling of floating movement so that they can follow lateral movement of the pipe and irregularities in its surface. Wiper blades extending axially along opposite edges of the shoes hold the liquid couplant for the transmission of ultrasonic vibrations against leakage circumferentially from the space between the shoes and the pipe, and thereby enable the spacing between the shoes and the surface of the pipe to be increased and provide a greater radial depth of the liquid couplant on the surface of the pipe. A manifold on each shoe delivers the liquid couplant to the space between the wiper blades through openings provided for this purpose in the shoe. The universal mounting for the shoes, the wiper blades along opposite edges thereof, and the manifold for delivering liquid thereto cooperate to provide an improved liquid couplant for the transmission of ultrasonic vibrations between the pipe and a transducer mounted on the shoes.

INVENTOR
AXEL H. PETERSON
By William G. Young
Attorney

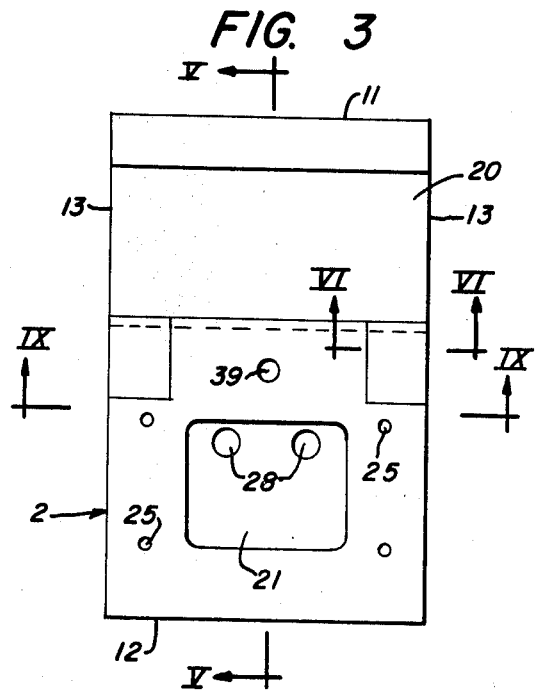
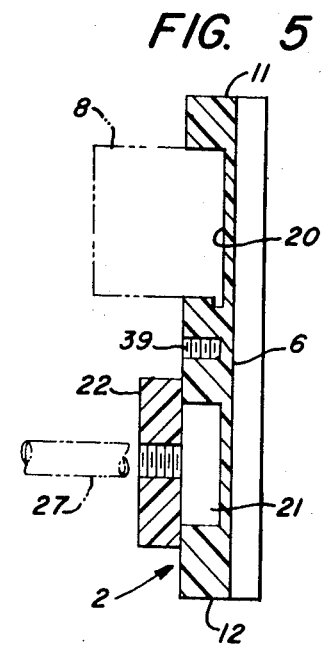
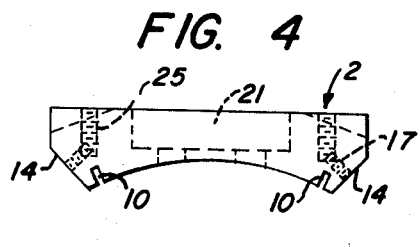
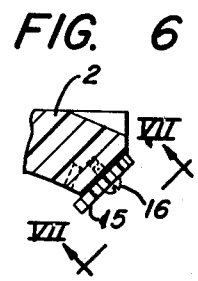
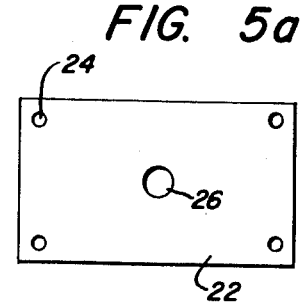
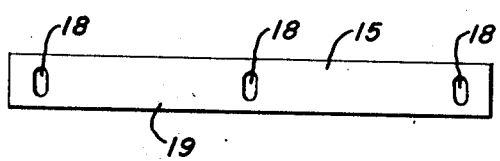
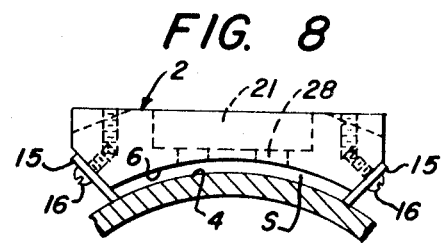
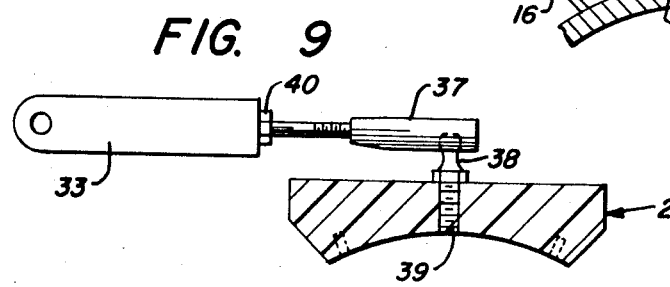
INVENTOR
AXEL H. PETERSON
By William H. Young
Attorney

ULTRASONIC PIPE-TESTING EQUIPMENT

This invention relates, as indicated, to ultrasonic apparatus for the nondestructive inspection of a longitudinal weld seam in electricweld pipe. It relates, more particularly, to improvements which are directed to the end of obtaining a more efficient transmission of ultrasonic vibrations between the pipe and an ultrasonic transducer. This is accomplished in a manner to be described by providing a more effective fluid couplant for transmitting ultrasonic energy between the shoe on which the transducer is mounted and the pipe.

More specifically, the invention relates to ultrasonic inspection equipment of the type which employs a contour shoe when in operative position on a pipe having a curved surface that is radially spaced and concentric with respect to the surface that is radially spaced and concentric with respect to the surface of a pipe undergoing inspection. In such equipment ultrasonic vibrations are transmitted to and from a transducer on the shoe by a film of liquid couplant, either water, oil, or other hydraulic fluid, but preferably water, which fills the space between the curved surface on the shoe and the outer surface of the pipe. Previous designs of such equipment, however, have been subject to troublesome problems in operation as the result of entrainment and entrapment of air in the couplant film, and from fragmentation and other discontinuities therein. The avoidance of such problems has been generally regarded as requiring that the couplant film be maintained as thin as possible. Contrary to this impression, I have found that improved results are obtained by employing a film of fluid couplant having a radial depth or thickness much greater than was previously considered practical.

One of the principal objects of this invention is to provide ultrasonic testing equipment having improvements directed to the end of eliminating conditions which cause fragmentation of, or the entrainment and entrapment of air in the couplant film in the space between the outer surface of a pipe and the curved surface of an inspection shoe carrying an ultrasonic transducer. To this end, the contour shoe is provided with axially extending wiper blades along opposite edges thereof which have wiping engagement with the surface of the pipe to restrict the flow of the fluid couplant from the space between the contour shoe and the pipe. In addition the shoe has a resilient bias for holding it in a position with the edges of its wiper blades engaged with the surface of the pipe, such bias being applied to the shoe through a universal connection that provides for floating or swiveling movement of the shoe. By reason of its universal connection, the shoe may follow changes in the surface of the pipe, such as those caused by lateral movement of the pipe, or pipe having an oval shape, without disengagement of the wiper blades with the surface of the pipe, and without change in the continuity and radial dimension of the fluid couplant film between the shoe and the surface of the pipe. To reduce turbulence and assure a continuous couplant film, a supply manifold on the shoe is connected by openings through the shoe with the space between the wiper blades for the delivery of fluid couplant thereto.

A further object of this invention is to provide an articulated mounting for a pair of transducer shoes of the type mentioned above in which the shoes are supported in circumferentially spaced positions on the surface of a pipe by a pair of links that are pivoted on opposite ends of a support extending transversely of the pipe, the resilient bias for holding the shoes in operative positions on the pipe being effected by a common spring having opposite ends thereof connected with the shoe-mounting links for biasing their movement in opposite rotational directions.

Other objects and advantages of the invention will become apparent from the following description and the accompanying drawings, which illustrate a preferred embodiment of the invention. In the drawings:

FIG. 3 is a plan view of one of the shoes shown in FIG. 1;

FIG. 4 is an end view of the shoe shown in FIG. 3;

FIG. 5 is a sectional view taken substantially along the line V—V of FIG. 3, in which the positions of the transducer and manifold cover plate on the shoe are illustrated diagrammatically in dotted lines;

FIG. 5a is a plan view of one of the manifold cover plates;

FIG. 6 is a fragmentary sectional view taken substantially along the line VI—VI of FIG. 3, this view further showing the position of one of the wiper blades thereon;

FIG. 7 is a plan view of one of the wiper blades that extend along opposite edges of the shoe of FIG. 3, this view being taken looking in the direction of the line VII—VII of FIG. 6;

FIG. 8 is a view of modified construction in which wiper blades at opposite edges of the contour shoe act as skids to support the shoe on the pipe being inspected; and FIG. 9 is a transverse sectional view taken centrally of one of the shoes shown in FIGS. 1 and 2 with a fragmentary portion of its mounting linkage shown in side elevation.

Figure 2:
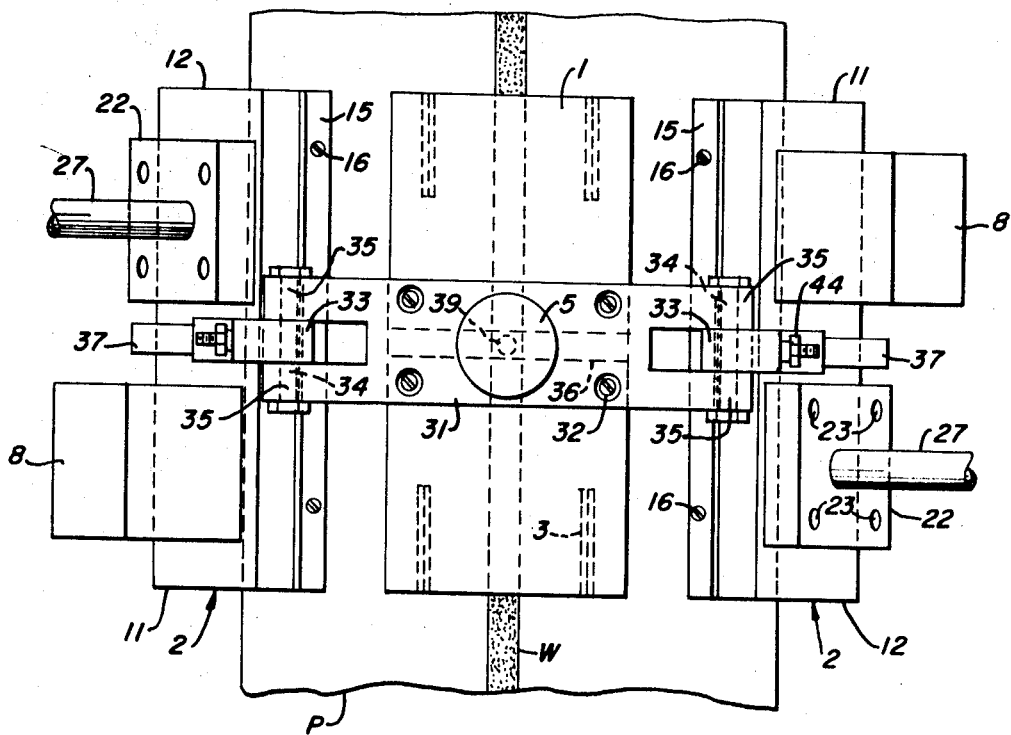
FIG. 2 is a plan view of the apparatus shown in FIG. 1.
Figure 1:
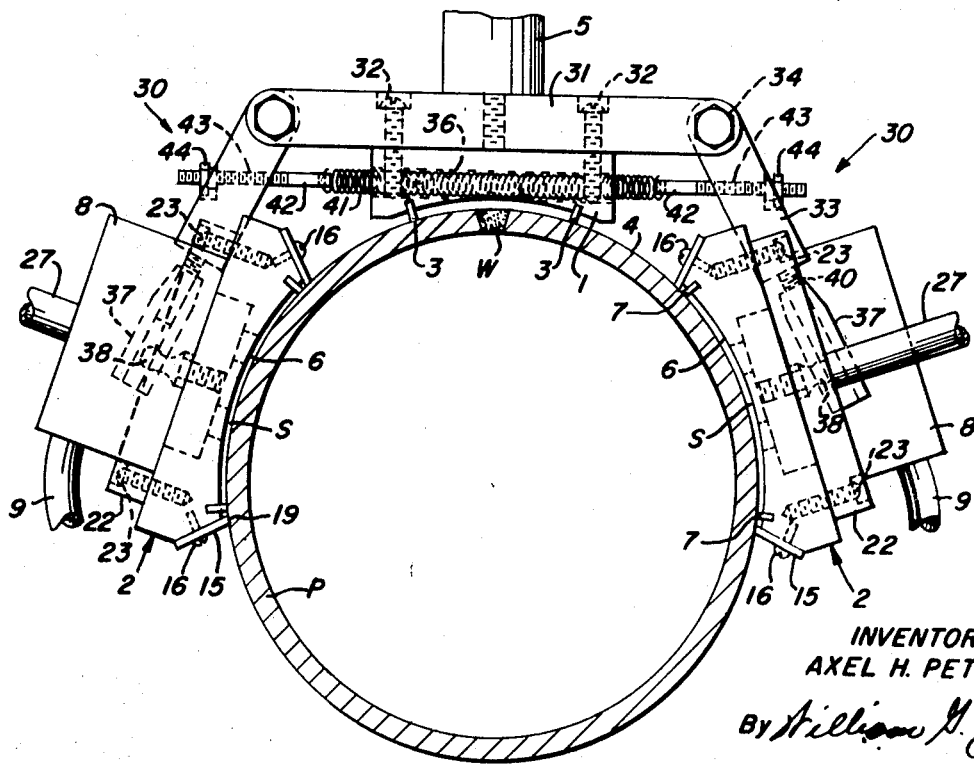
FIG. 1 is an elevational view showing the operative position of the ultrasonic testing equipment of this invention with respect to the weld in electricweld pipe.

The apparatus shown in the drawings comprises a saddle 1 for supporting a pair of contour shoes 2 on a pipe P having an electric resistance weld W. The saddle 1 is supported by skids 3, which have sliding engagement with the outer surface 4 of the pipe on opposite sides of the weld W. A handle 5 is provided for manually holding the the saddle 1 on the pipe with the shoes 2 spaced circumferentially equal distances from the weld W. Each of the shoes 2 has a curved surface 6 which has the shape of a cylindrical segment an in the operative position shown in FIG. 1 is substantially concentric with and faces the pipe surface 4. Axially extending skids 7 at each of the four corners of each shoe support it with the surface 6 spaced outwardly from the pipe surface 4 to provide a space S which is filled with a liquid, preferably water, that acts as a couplant in a manner to be described for the transmission of ultrasonic vibrations between the pipe P and ultrasonic transducers 8 mounted on the shoes 2. Cables 9 connect the transducers to an electric power source and also to a receiving means for analyzing the reflected vibrations from the weld W. When connected to the power source, each transducer 8 produces ultrasonic vibrations, which are fed into the pipe P through the shoes 2 and the couplant liquid in the space S, and travel around the circumference of the pipe to the weld W where they are reflected back to the transducer, for transmission by the cable 9 to an oscilloscope or other analyzing means. When applied to a pipe the shoes 2 occupy reverse positions thereon so that the transducers 8 are axially spaced relative to each other and do not receive signals from each other. The general construction of the apparatus and its operation as thus far described are known and form no part per se of this invention.

As indicated above, the shoes 2 are supported on the pipe P by the skids 7, which operate to fix the radial dimension of the space S with respect to the outer surface 4 of the pipe P, and thus the depth of the liquid couplant in the space S. The skids 7 are mounted in slots 10 which extend axially inwardly from opposite ends 11 and 12 of the shoes 2 as best shown in FIG. 4.

In accordance with the principles of this invention, opposite axially extending edges 13 of the shoes 2 are bevelled to provide surfaces 14 on which wiper blades 15 are mounted. The angle of the surfaces 14 is such that the wiper blades 15 extend substantially radially or in a direction generally toward the center of the pipe P. The blades 15 are secured to the surfaces 14 by screws 16 which engage in threaded openings 17 in the shoes 2. The screws 16 extend through openings 18 in the blades 15 which are elongated in a transverse direction to provide for adjustment of the position of their edges 19 which have wiping engagement with the pipe surface 4. When the shoes 2 are supported on the pipe surface 4 by skids 7, the wiper blades 15 may be fabricated from materials, such as fiber glass, neoprene, or other suitable materials that will provide satisfactory wiping and sealing engagement with the pipe surface 4. The blades 15, in operation, act as seals to prevent the leakage of liquid couplant from the space S along the opposite edges 13 of the shoes 2, so that the liquid couplant can flow out of the space S only at the opposite ends 11 and 12 of the shoes 2.

As shown in FIG. 8, the shoes 2 may be constructed without the slots 10 and skids 7 and, in such case, the blades 15 may be used to support the shoes 2 on the pipe surface 4. In this modification, the blades 15 are fabricated from a suitable metal, preferably tungsten carbide, so that they act as supporting skids in the manner of the skids 7 mentioned above. In addition, the screws 16 extending through the slots 18 provide for adjustment of the radial positions of the blades 15 and thus the radial dimension of the space S between the pipe surface 4 and the shoe surface 6, which determines the depth of the liquid couplant in the space S.

As best shown in FIGS. 3 and 5, each shoe 2 is provided with a transversely extending slot 20 adjacent the end 11 thereof in which a transducer 8 is mounted. The position of the transducer 8 in the slot 20 is indicated diagrammatically by broken lines in FIG. 5. The transducer 8 is secured in the slot 20 by screws (not shown) or other suitable fastening device.

Adjacent its opposite end 12, each shoe 2 has a manifold 21 of rectangular shape for the delivery of fluid to the space S. A cover plate 22 for the manifold 21 is secured to the shoe 2 by screws 23 that extend through openings 24 in the four corners of the cover plate into threaded openings 25 in the shoe 2. As shown in FIG. 5a the cover plate 22 has a central opening 26 in which the end of a fluid supply conduit 27 has a threaded connection for the delivery of fluid to the manifold 21. Openings 28 in the shoe 2 connect the manifold 21 with the space S for the supply liquid couplant thereto. Sufficient fluid is supplied through the conduit 27 to maintain the space S filled with fluid.

The shoes are maintained in operative positions on the pipe P, as shown in FIG. 1, by an articulated linkage, designated as a whole by the numeral 30. The linkage 30 comprises a support 31 which extends transversely with respect to the saddle joint and is secured thereto by screws 32. Each of the shoes 2 is mounted on the support 31 by links 33 that have pivotal connections at their upper ends with pivot pins 34 on opposite ends of the support 31. For this purpose, the opposite ends of the support 31 are bifurcated to provide spaced arms 35 which have aligned openings therein for the reception of the pivot pins 34. The lower end of each of the links 33 has a universal connection 37 with the shoe 2 at a point centrally thereof. The universal connection is a ball and socket joint in the form of a ball 38 that has a threaded connection in an opening 39 in the shoe 2, and a socket on the lower end of the link 30 in which the ball 38 is received. A threaded coupling 40 connects the upper and lower end of each link 33 and provides for adjustment of the position of the ball and socket joint 37 with respect to the pivot pin 34. By reason of the central location of the universal connections 37 with respect to the corners of the shoes 2, each shoe 2 has a floating support on the lower ends of the links 33 that enables it to move to a position determined by the contour of the pipe surface 4 without disengagement of the wiper blades 15 therewith.

The links 30 are biased for pivotal movement in opposite rotational directions by a common coil spring 41 that extends through an opening 36 in the saddle 1. Opposite ends of the spring 41 are connected with the adjacent ends of pins 42 that extend through openings 43 in the links 33 and have set nuts 44 threaded on the other ends thereof. The nuts 44 provide for adjustment of the tension of the spring 41 and apply its resilient biasing force to the links 30 and the shoes 2 supported by the lower ends thereof. The resilient biasing force is applied centrally to each shoe through the universal connection 37 to hold the blades 15 engaged with the pipe surface 4.

Although the support 32 is mounted on the saddle 1, which is held manually by the handle 5 as disclosed in the Chrulski application mentioned above, it will be understood that the support 31 may be mounted in a fixed position on a stationary support.

By reason of the mountings for the shoes 2 that are provided by the articulated linkages 30, it will be apparent that each shoe 2 has a floating or a swiveling support on the pipe 2 which renders the action of its biasing spring 41 effective to maintain the edges 19 of the blades 15 in wiping engagement with the outer pipe surface 4. In this respect, it will be noted that the limited universal or swiveling movement of the shoes 2, which is provided by the universal or ball joint connections 37, enables the shoes 2 to follow changes in the contour of the pipe surface 4 without disturbing the sealing engagement of the edges 19 of the wiper blades 14 therewith. Transverse movement of the pipe P in any direction, or an oval shape in its surface 4, thus do not result in escape of the fluid couplant along opposite edges of the shoes 2, and the space S is thus maintained filled with liquid couplant.

Attention is also directed to the fact that the wiper blades 15 and the manifold 21 for delivering fluid to the space S contribute to the elimination of bubbles and discontinuities in the liquid couplant is supplied to the space S through the openings 28 at points b between the wiper blades 15 without any aspirating action which would draw bubbles of air into the space S. The blades 15 contribute to this feature in that they direct the flow of fluid couplant through the space S to the opposite ends 11 and 12 of the shoes where it is exhausted over the surface of the pipe, and thus prevent the admission of atmospheric air into the space S at opposite ends of the shoe.

While one embodiment of my invention has been shown and described, it will be apparent that adaptations and modifications may be made without departing from the scope of the appended claims.

I claim:

1. In ultrasonic pipe inspection apparatus, the combination with a shoe having a segmental cylindrical surface on one side thereof extending axially and circumferentially with respect to the surface of a pipe to be inspected, of a biasing mounting for said shoe comprising a link having a supporting pivot at one end thereof, means connecting the other end of said link with said shoe at a point located centrally of the other side thereof, said connecting means providing for universal swiveling movement of said shoe with respect to said link, means resiliently biasing the movement of said link about said pivot to bias said shoe for movement in a direction toward said pipe, spacer means on said shoe for engaging said pipe to hold said shoe surface spaced a predetermined distance from said pipe surface, and fluid supply means for delivering liquid to the space between said shoe and pipe surfaces, said spacer means including blades extending axially along said opposite edges and having wiping engagement with said pipe surface for sealing said space against leakage of fluid along said opposite shoe edges, said wiper blades operating to constrain the flow of liquid out of said space in an axial direction from opposite ends of said shoe.

2. Pipe inspection apparatus as defined in claim 1 characterized by said fluid supply means comprising a manifold on said shoe, a conduit for supplying liquid to said manifold, and a passageway opening from said manifold into said space at a point between said wiper blades for delivering fluid from said manifold into said space.

3. A pipe inspection apparatus of the type defined in claim 1 characterized by there being a pair of said shoes, a support extending transversely of said pipe, and articulated linkages respectively including one of said links and one of said pivots mounting said shoes on opposite ends of said support.

4. Pipe inspection apparatus as defined in claim 1 characterized by said connecting means comprising a universal movement of said shoes with respect to the said other end of said link.

5. Pipe inspection apparatus as defined in claim 3 characterized by said resilient means comprising a common spring extending transversely with respect to the axis of said pipe and having opposite ends thereof connected with said links for biasing their respective pivotal movements in opposite directions.

6. In ultrasonic apparatus for inspecting pipe, the combination with an inspection shoe having a curved surface in the shape of a cylindrical segment, and means supporting said shoe with said curved surface spaced radially from and facing the surface of a pipe to be inspected, of a pair of circumferentially spaced wiper blades respectively extending axially along opposite edges of said shoe and having wiping engagement with said pipe surface, and means for introducing liquid into the space between said shoe and pipe surfaces comprising a manifold on said shoe in a position located radially outwardly with respect to said curved surface, a liquid supply conduit connected with said manifold for delivering liquid thereto, and a passageway for the flow of liquid from said manifold in a radial direction direction into said space at a point between said wiper blades, said blades operating to prevent leakage of said fluid from said space along the said opposite edges of said shoe and to constrain the flow of fluid out of space in an axial direction from opposite ends of said shoe.

7. Pipe inspection apparatus as defined in claim 6 characterized by adjustable means supporting said wiper blades on said shoes for movement toward and away from said pipe surface to adjust their respective wiping engagement therewith.

8. Pipe inspection apparatus as defined in claim 6 characterized by a plurality of spacer elements on said shoe and in sliding engagement with said pipe for holding said pipe and shoe surfaces spaced radially relative to each other.

9. The invention defined in claim 8 characterized by each of said spacer elements comprising skids secured to said shoe and extending axially with respect to and in sliding engagement with said pipe surface.

10. The invention defined in claim 9 characterized by said skids comprising said wiper blades.

11. The pipe inspection apparatus defined in claim 7 in which said wiper blades operate to space said shoe surface with respect to said pipe surface.

12. Pipe inspection apparatus as defined in claim 6 characterized by said supporting means comprising biasing means engaged with said shoe at a point centrally between opposite ends of said wiper blades at the four corners of said shoe for resiliently holding said shoe with said wiper blades in wiping engagement with said pipe surface.

13. Pipe inspection apparatus as defined in claim 12 characterized by means mounting said shoe for universal swiveling movement on said supporting means at said central point.

14. A pipe inspection apparatus as defined in claim 13 characterized by said shoe-mounting means comprising a ball joint on said central point, and by said biasing means comprising a pivotal link to which said ball joint is connected for applying said resilient biasing force to said shoe.

UNITED STATES PATENT OFFICE
CERTIFICATE OF CORRECTION

Patent No. 3,602,036      Dated August 31, 1971

Inventor(s) Axel H. Peterson

It is certified that error appears in the above-identified patent and that said Letters Patent are hereby corrected as shown below:

Column 1, line 13, at the end of the line, after "shoe", add -- as a support for an ultrasonic transducer, the contour shoe --; lines 16 and 17, after "is", cancel "radially spaced and concentric with respect to the surface". Column 3, line 34, at the end of the line, after "saddle", add -- 1 --; line 35, at the beginning of the line, cancel "joint".

Signed and sealed this 10th day of October 1972.

(SEAL)
Attest:

EDWARD M. FLETCHER, JR.        ROBERT GOTTSCHALK
Attesting Officer              Commissioner of Patents